M. T. McCORMICK.
OIL-WELL WALL CLEANER.

No. 184,254. Patented Nov. 14, 1876.

Witnesses.
B. C. Pole
R. H. Lacey

Inventor
Mark T. McCormick
By R. S. & A. P. Lacey
attys

UNITED STATES PATENT OFFICE.

MARK T. McCORMICK, OF PETROLIA, PENNSYLVANIA.

IMPROVEMENT IN OIL-WELL-WALL CLEANERS.

Specification forming part of Letters Patent No. 184,254, dated November 14, 1876; application filed October 7, 1876.

*To all whom it may concern:*

Be it known that I, MARK T. MCCORMICK, of Petrolia, in the county of Butler and State of Pennsylvania, have invented certain new and useful Improvements in Oil-Well-Wall Cleansers; and I do hereby declare that the following is a full, clear, and exact description thereof, which will enable others skilled in the art to which it pertains to make and use the same, reference being had to the accompanying drawing, and to the letters of reference marked thereon, which form a part of this specification.

My invention relates to devices employed for the purpose of increasing the flow of oil by washing or removing the paraffine or other obstructions from the walls of the well. It consists in a heavy weight, provided with two or more collars, fitting loosely the bore of the well, and having its lower end perforated with a series of orifices, so arranged that when dropped from a considerable height onto the oil or other fluid, an ebullition or eddy of the latter is created, as hereinafter fully explained.

Figure 1:
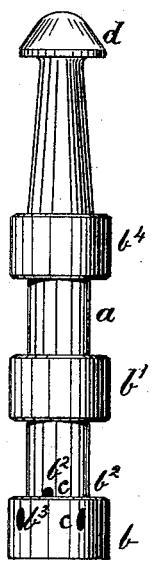
Figure 2:
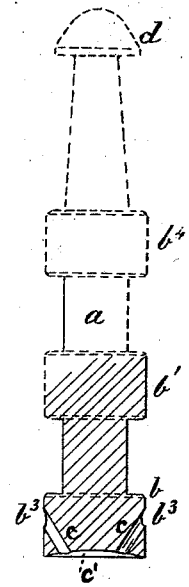
Figure 4:
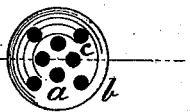
Figure 3:
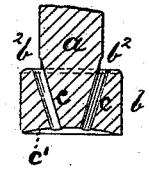
Figure 5:

In the drawings, Figure 1 is a side elevation; Figs. 2 and 3 are vertical sections of the lower end of the weight, showing different orifices, and Figs. 4 and 5 are views of under side of the lower end, showing the orifices in different arrangements.

It is found by experience that an oil-well will, after being used a considerable length of time, cease to yield the quantity of oil as when first bored. Various theories have been advanced to account for this cessation. By experiment I have become satisfied that it is due to the accumulation of paraffine or other substance on the walls of the well, whereby the seams, fissures, or pores of the oil-rock are closed, and the flow of oil thus stopped.

By further experiment I have become convinced that any means that will cause a sudden and forcible ebullition or commotion of the oil or other fluid in the well within the oil-rock results in bringing an increased flow of oil. My conclusions are that this forcible movement of the fluid washes off the accumulations from the walls of the well, thereby opening the pores, seams, or fissures, so that the oil can readily escape from the rock into the well.

I have discovered that this ebullition can be created by a heavy weight, suitably constructed, dropped from the surface, or from any considerable height, onto the fluid.

To provide such a weight is the object of my invention.

$a$ is the weight, having the collars $b$ $b^1$, which are formed so as to enter and fit loosely in the bore of the well, there being an intervening space between them and the walls of the latter of about one-fourth or one-half an inch. $c$ are a series of perforations formed in, and arranged at equal distances apart around, the lower end of the weight. They extend from the under face $c^1$ upward, with an outward incline, and open on the top and sides of the collar $b$, as shown at $b^2$ $b^3$.

The construction and arrangement of the porforations $c$, as described, will give an outward and upward projection of the fluid, so that the latter will strike all sides of the well at an acute angle, whereby is obtained the greatest power in the process of removing the accumulations from the walls. The fluid, being forced upward through the perforations $c$, strikes the walls, from which it is deflected inwardly to the weight. It is caught by the collar $b^1$, placed at a proper distance above the under collar $b$, and is turned downward along the main part of the weight in the space between the collars, and is again turned outward by the under collar, so that there is made a forcible eddy or ebullition within said intervening space.

It will be seen that, by the arrangement and construction described, I not only obtain and utilize the greatest possible power from the jet of fluid from the perforations $c$, but I obtain the additional power or force of the fluid in its eddies or forcible revolution.

The collar $b^1$ is arranged with reference to the upper openings of the perforations $c$, so as to catch the jet of the fluid when the latter is deflected and thrown off from the walls of the well.

As the weight descends into the fluid the latter will be forced upward past the collar $b^1$, and, for the purpose of further utilizing the movement of the oil, a second collar, $b^4$, is formed on the weight. This second collar causes a second eddy or commotion within the intervening space between it and the collar $b^1$. The upper end of the weight is made tapering, and is capped by a head or flange, $d$, on which the grapplers are attached when it is to be raised from the well.

When it is desired to use my invention, the tubing and other fixtures are removed, and the weight is dropped from the surface into the well. When the wells are deep, and it is desirable to make more than one application of the weight, the latter need not be raised to the surface, but may be dropped from any desired height by releasing the grapplers by any well-known means.

It will be understood that there is often an accumulation of water in oil-wells, and that the dropping of the weight onto the water produces the same result as when dropped onto the oil.

Having described my invention, what I claim, and desire to secure by Letters Patent, is—

1. The weight $a$, provided with the collar $b$, having a series of perforations, $c$, constructed as described, and with the upper collars $b^1$ $b^4$, substantially as and for the purposes set forth.

2. A weight, $a$, provided with a collar, $b$, pierced by a series of perforations, $c$, which are formed from the under end $c'$, and extend upward, and are inclined outward, and arranged around the weight, and with the collar $b^1$, placed above the under collar $b$, substantially as and for the purpose set forth.

In testimony that I claim the foregoing as my own I affix my signature in presence of two witnesses.

MARK T. McCORMICK.

Witnesses:
H. W. BRELSFORD,
JOHN W. KESSLER.